United States Patent
Lee et al.

(10) Patent No.: US 8,451,889 B2
(45) Date of Patent: May 28, 2013

(54) METHOD AND APPARATUS FOR ENCODING AND DECODING IMAGE BY USING SUB-PIXEL-BASED MOTION PREDICTION

(75) Inventors: Tammy Lee, Seoul (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 12/397,484

(22) Filed: Mar. 4, 2009

(65) Prior Publication Data

US 2010/0226434 A1    Sep. 9, 2010

(30) Foreign Application Priority Data

Mar. 4, 2008   (KR) ........................ 10-2008-0020072

(51) Int. Cl.
*H04N 7/12*   (2006.01)
*G06K 9/32*   (2006.01)

(52) U.S. Cl.
USPC .......................................... 375/240; 382/300

(58) Field of Classification Search
USPC ......................................... 375/240
See application file for complete search history.

(56) References Cited

U.S. PATENT DOCUMENTS

| 6,950,469 | B2 | 9/2005 | Karczewicz et al. |
| 2007/0104270 | A1* | 5/2007 | Song et al. ............... 375/240.03 |
| 2008/0069203 | A1* | 3/2008 | Karczewicz et al. .... 375/240.01 |

FOREIGN PATENT DOCUMENTS

| JP | 07-154759 A | 6/1995 |
| JP | 2005-142858 A | 6/2005 |

* cited by examiner

*Primary Examiner* — Sath V Perungavoor
*Assistant Examiner* — Xiaolan Xu
(74) *Attorney, Agent, or Firm* — Sughrue Mion, PLLC

(57) ABSTRACT

Provided are a method and apparatus for encoding an image by using sub-pixel-based motion prediction and a method and apparatus for decoding an image by using sub-pixel-based motion prediction. The method of encoding an image includes determining weights for respective low-precision sub-pixels for interpolation between the low-precision sub-pixels, determining an interpolation direction for the low-precision sub-pixels based on a position of a high-precision sub-pixel between the low-precision sub-pixels, and performing motion prediction in units of high-precision sub-pixels determined by interpolation which applies the interpolation direction and the weights to the low-precision sub-pixels.

21 Claims, 10 Drawing Sheets

METHOD AND APPARATUS FOR ENCODING AND DECODING IMAGE BY USING SUB-PIXEL-BASED MOTION PREDICTION

CROSS-REFERENCE TO RELATED PATENT APPLICATION

This application claims priority from Korean Patent Application No. 10-2008-0020072, filed on Mar. 4, 2008, in the Korean Intellectual Property Office, the disclosure of which is incorporated herein in its entirety by reference.

BACKGROUND OF THE INVENTION

1. Field of the Invention

Apparatus and methods consistent with the present invention relate to encoding and decoding an image, and more particularly, to a method and apparatus for encoding and decoding an image by using sub-pixel-based motion prediction.

2. Description of the Related Art

In image encoding/decoding methods using motion prediction, e.g., the H.264 video compression standard, motion prediction is performed by intraprediction and interprediction. Intraprediction is a process of reducing spatial redundancy within a single frame. H.264 intraprediction is designed to improve the compression efficiency of intraprediction by performing motion prediction prior to frequency conversion, which is based on an idea that adjacent macroblocks have similar characteristics.

Interprediction is performed on the basis of motion estimation and motion compensation that allow the removal of redundancy between consecutive frames. H.264 interprediction is different from former video compression standards in that it supports motion prediction with a precision of ¼ pixel. Sub-pixel-based motion prediction provides higher compression efficiency than integer-pixel-based motion prediction and the precision of ¼ pixel exhibits better performance than a precision of integer pixel.

FIG. 1 illustrates a relationship between positions of integer pixels and sub-pixels according to the H.264 standard.

Integer pixels are indicated by capital letters and sub-pixels are indicated by small letters. In other words, A, B, C, D, E, F, G, H, I, J, K, L, M, N, O, P, Q, R, S, T, and U indicate integer pixels, b, h, j, m, s, aa, bb, cc, dd, ee, ff, gg, and hh indicate ½ pixels, and a, c, d, e, f, g, i, k, n, p, q, and r indicate ¼ pixels.

The first ½ pixel is sampled by applying 6-tap finite impulse response (FIR) filtering to integer pixels. Once a ¼ pixel is obtained by interpolation between the obtained ½ pixel and an integer pixel, motion prediction uses the ½ pixel and the ¼ pixel, i.e., sub-pixels.

FIG. 2 is a block diagram of an image encoder 200 using motion prediction.

Since a ½ pixel is generated by using 6-tap FIR filtering as mentioned above, the image encoder 200 generates a ½ pixel in a beforehand sub-pixel interpolation unit 210 and stores a frame in units of ½ pixels in a frame storage unit 220. A ¼ pixel is generated by a relatively simple operation such as bilinear filtering of the frame stored in the frame storage unit 220. Thus, a frame in units of ¼ pixels is used for motion prediction performed in a motion estimation unit 240 and a motion-compensated prediction unit 250. Motion information is transmitted in the form of a motion vector for each sub-pixel.

SUMMARY OF THE INVENTION

The present invention provides a method and apparatus for encoding an image by using sub-pixel-based motion prediction and a method and apparatus for decoding an image by using sub-pixel-based motion prediction, whereby precise motion prediction can be performed by using a high-precision sub-pixel in image encoding or decoding using motion prediction.

The present invention also provides a method and apparatus for encoding an image by using sub-pixel-based motion prediction and a method and apparatus for decoding an image by using sub-pixel-based motion prediction, whereby overhead required to encode high-precision sub-pixel information can be minimized.

According to an aspect of the present invention, there is provided a method of encoding an image by using motion prediction. The method includes determining weights for respective low-precision sub-pixels for interpolation between the low-precision sub-pixels, determining an interpolation direction for the low-precision sub-pixels based on a position of a high-precision sub-pixel between the low-precision sub-pixels, and performing motion prediction in units of high-precision sub-pixels determined by interpolation which applies the interpolation direction and the weights to the low-precision sub-pixels.

The method may further include encoding information about the weights and a motion vector for a predetermined-precision sub-pixel as motion prediction information for the high-precision sub-pixel.

In the encoding of the information and the motion vector, the predetermined precision may be equal to or higher than a precision of the low-precision sub-pixel and may be equal to or lower than a precision of the high-precision sub-pixel.

The determination of the interpolation direction may include determining the interpolation direction in units of at least one data unit, and the data unit may be at least one of a frame, a picture, a slice, and a block.

The determination of the interpolation direction may include determining the interpolation direction to be one of a direction of interpolation between adjacent low-precision sub-pixels arranged vertically, a direction of interpolation between adjacent low-precision sub-pixels arranged horizontally, a direction of interpolation between adjacent low-precision sub-pixels arranged diagonally-right, and a direction of interpolation between adjacent low-precision sub-pixels arranged diagonally-left, according to a position of the high-precision sub-pixel.

The determination of the weights may include determining the weights that are in proportion to distances from the respective low-precision sub-pixels to the low-precision sub-pixels to be interpolated.

The determination of the weights may include determining the weights to include one of a set of weights of ⅓ and ⅔ for the low-precision sub-pixels to be interpolated, a set of weights of ½ and ½ for the low-precision sub-pixels to be interpolated, and a set of weights ⅔ and ⅓ for the low-precision sub-pixels to be interpolated.

The encoding of the information and the motion vector may include encoding predetermined indices that are set for the weights for the low-precision sub-pixels as the information about the weights.

According to another aspect of the present invention, there is provided a method of decoding an image by using motion prediction. The method includes extracting image data, a motion vector, and weight information for a predetermined-precision sub-pixel from a received data stream, determining low-precision sub-pixels by using the extracted image data and the extracted motion vector for the predetermined-precision sub-pixel, determining high-precision sub-pixels by using the determined low-precision sub-pixels and the extracted weight information, and reconstructing image data by performing motion prediction on the extracted image data by using the high-precision sub-pixels.

The determination of the high-precision sub-pixels may include, if the weight information is in the form of indices, determining weights corresponding to the indices for respective low-precision sub-pixels to be interpolated, and determining the high-precision sub-pixels by applying corresponding weights to low-precision sub-pixels located in a predetermined interpolation direction.

In the determination of the weights, the weights may be in proportion to distances of the respective low-precision sub-pixels to be interpolated and may be determined to include one of a set of weights of ⅓ and ⅔ for the low-precision sub-pixels to be interpolated, a set of weights of ½ and ½ for the low-precision sub-pixels to be interpolated, and a set of weights ⅔ and ⅓ for the low-precision sub-pixels to be interpolated.

In the determination of the high-precision sub-pixels, the interpolation direction may be set in units of at least one data unit and the data unit may be at least one of a frame, a picture, a slice, and a block.

The determination of the high-precision sub-pixels may include determining the predetermined-precision sub-pixel based on the extracted motion vector for the predetermined-precision sub-pixel and determining the interpolation direction to be one of a direction of interpolation between adjacent low-precision sub-pixels arranged vertically, a direction of interpolation between adjacent low-precision sub-pixels arranged horizontally, a direction of interpolation between adjacent low-precision sub-pixels arranged diagonally-right, and a direction of interpolation between adjacent low-precision sub-pixels arranged diagonally-left, according to a position of the predetermined-precision sub-pixel.

The predetermined precision may be equal to or higher than a precision of the low-precision sub-pixel and may be equal to or lower than a precision of the high-precision sub-pixel.

According to another aspect of the present invention, there is provided an apparatus for encoding an image by using motion prediction. The apparatus includes a weight determination unit determining weights for respective low-precision sub-pixels for interpolation between the low-precision sub-pixels, an interpolation direction determination unit determining an interpolation direction for the low-precision sub-pixels based on a position of a high-precision sub-pixel between the low-precision sub-pixels, and a motion prediction unit performing motion prediction in units of high-precision sub-pixels determined by interpolation which applies the interpolation direction and the weights to the low-precision sub-pixels.

The apparatus may further include an encoding unit encoding information about the weights and a motion vector for a predetermined-precision sub-pixel as motion prediction information for the high-precision sub-pixel, wherein the predetermined precision is equal to or higher than a precision of the low-precision sub-pixel and is equal to or lower than a precision of the high-precision sub-pixel.

According to another aspect of the present invention, there is provided an apparatus for decoding an image by using motion prediction. The apparatus includes a data extraction unit extracting image data, a motion vector, and weight information for a predetermined-precision sub-pixel from a received data stream, a low-precision sub-pixel determination unit determining low-precision sub-pixels by using the extracted image data and the extracted motion vector for the predetermined-precision sub-pixel, a high-precision sub-pixel determination unit determining high-precision sub-pixels by using the determined low-precision sub-pixels and the extracted weight information, and an image reconstruction unit reconstructing image data by performing motion prediction on the extracted image data by using the high-precision sub-pixels.

According to another aspect of the present invention, there is provided a computer-readable recording medium having recorded thereon a program for implementing a method of encoding an image by using motion prediction. The method includes determining weights for respective low-precision sub-pixels for interpolation between the low-precision sub-pixels, determining an interpolation direction for the low-precision sub-pixels based on a position of a high-precision sub-pixel between the low-precision sub-pixels, and performing motion prediction in units of high-precision sub-pixels determined by interpolation which applies the interpolation direction and the weights to the low-precision sub-pixels.

According to another aspect of the present invention, there is provided a computer-readable recording medium having recorded thereon a program for implementing a method of decoding an image by using motion prediction. The method includes extracting image data, a motion vector, and weight information for a predetermined-precision sub-pixel from a received data stream, determining low-precision sub-pixels by using the extracted image data and the extracted motion vector for the predetermined-precision sub-pixel, determining high-precision sub-pixels by using the determined low-precision sub-pixels and the extracted weight information, and reconstructing image data by performing motion prediction on the extracted image data by using the high-precision sub-pixels.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
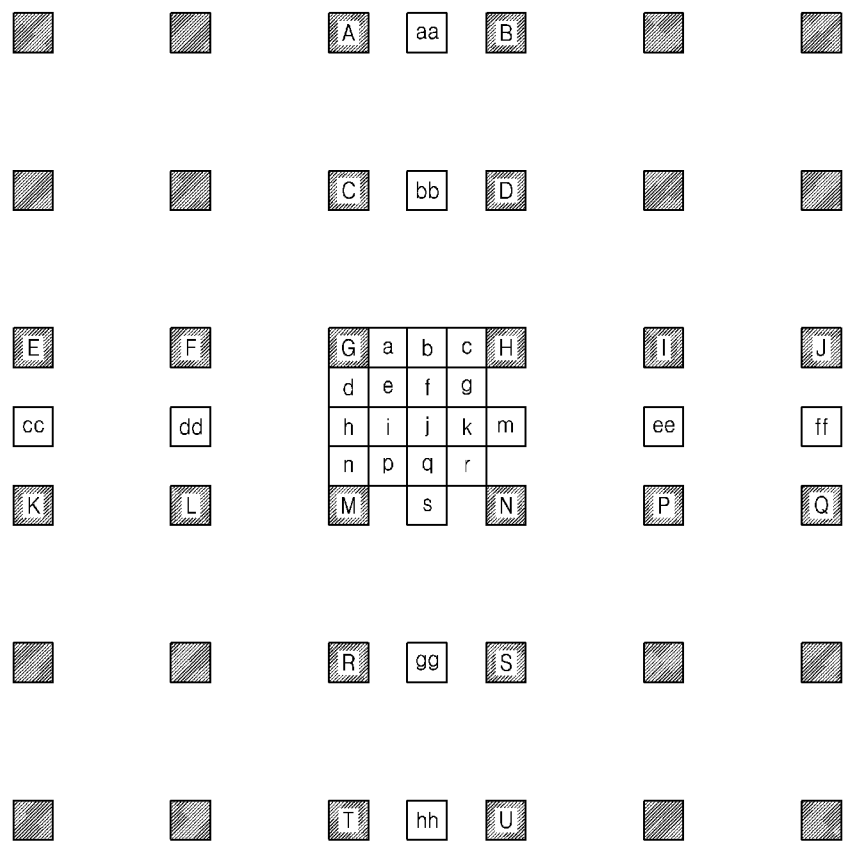
FIG. 1 illustrates a relationship between positions of integer pixels and sub-pixels according to the H.264 standard.
Figure 2:
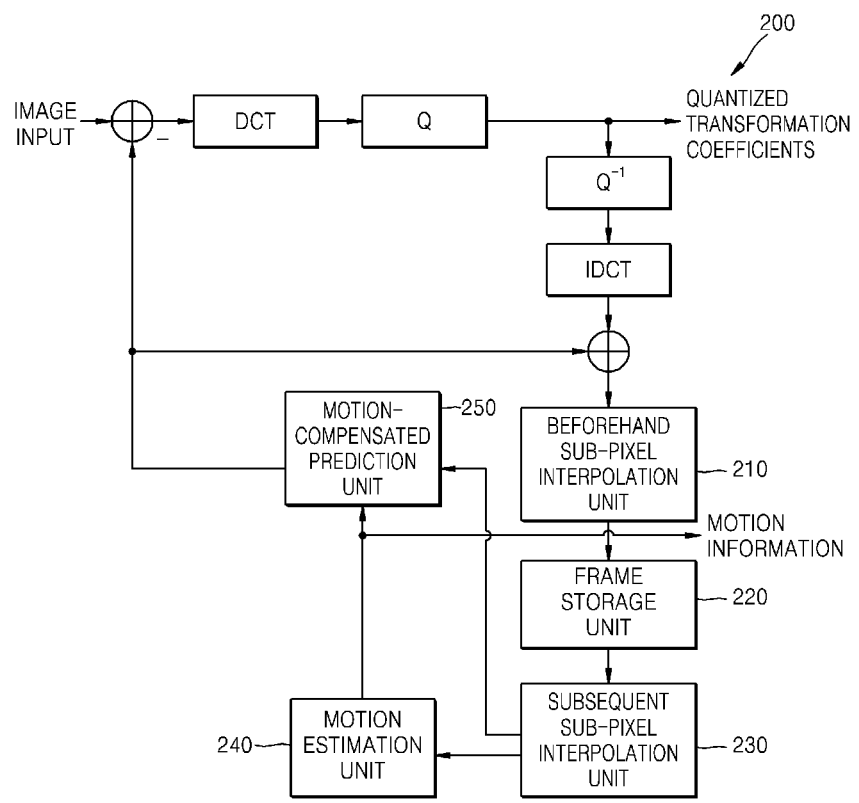
FIG. 2 is a block diagram of a conventional video encoder using motion prediction.

Hereinafter, embodiments of the present invention will be described in detail with reference to the accompanying drawings, in which exemplary embodiments of the invention are shown. It should be noted that like reference numerals refer to like elements illustrated in one or more of the drawings. In the following description of the present invention, detailed descriptions of known functions and configurations incorporated herein will be omitted for conciseness and clarity.

Figure 3:
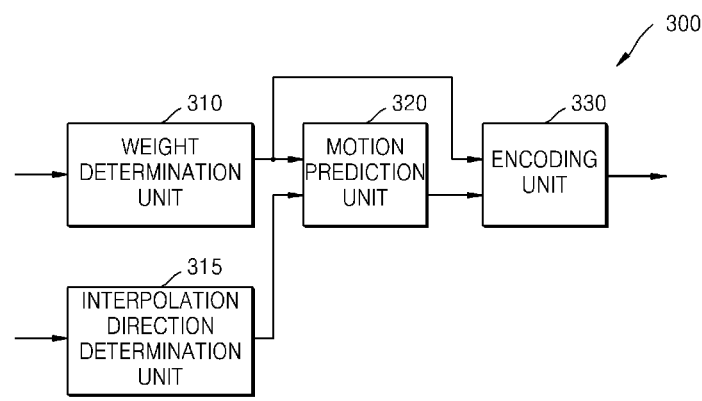
FIG. 3 is a block diagram of an apparatus for encoding an image by using motion prediction according to an exemplary embodiment of the present invention.

FIG. 3 is a block diagram of an apparatus 300 for encoding an image by using motion prediction according to an embodiment of the present invention.

The apparatus 300 according to the present embodiment includes a weight determination unit 310, an interpolation direction determination unit 315, a motion prediction unit 320, and an encoding unit 330. The apparatus 300 is based on image encoding using motion prediction.

For interpolation between low-precision sub-pixels, the weight determination unit 310 determines weights for the respective low-precision sub-pixels. The weight determination unit 310 then outputs the determined weights to the motion prediction unit 320 and the encoding unit 330. The low-precision sub-pixels for motion prediction may be located in a reference block or a reference picture for a current block or a current picture.

A weight for a low-precision sub-pixel may be determined to be in proportion to a distance from the low-precision sub-pixel to the low-precision sub-pixels to be interpolated.

The interpolation direction determination unit 315 determines an interpolation direction for the low-precision sub-pixels based on a position of a high-precision sub-pixel located between the low-precision sub-pixels and outputs the determined interpolation direction to the motion prediction unit 320.

When a high-precision sub-pixel is determined by interpolation between low-precision sub-pixels, an interpolation direction that determines the low-precision sub-pixels to be interpolated may be previously set. In other words, positions of low-precision sub-pixels and an interpolation direction may be previously determined according to a position of a high-precision sub-pixel.

The interpolation direction may be determined in units of at least one data unit. Here, a data unit is a concept including at least one of data processing units such as a data frame, a picture, a slice, and a block.

According to a position of a high-precision sub-pixel, an interpolation direction may be determined to be one of a direction of interpolation between adjacent low-precision sub-pixels arranged vertically, a direction of interpolation between adjacent low-precision sub-pixels arranged horizontally, a direction of interpolation between adjacent low-precision sub-pixels arranged diagonally-right, and a direction of interpolation between adjacent low-precision sub-pixels arranged diagonally-left.

The motion prediction unit 320 determines a high-precision sub-pixel by applying the weights determined by the weight determination unit 310 and the interpolation direction determined by the interpolation direction determination unit 315 to interpolation between low-precision sub-pixels and performs motion prediction in units of high-precision sub-pixels. Motion prediction information, e.g., motion vectors, obtained by the motion prediction unit 320 is output to the encoding unit 330.

The encoding unit 330 encodes information about the weights input from the weight determination unit 310 and the motion prediction information, such as motion vectors for a predetermined-precision sub-pixel, input from the motion prediction unit 320.

The predetermined precision may be equal to or higher than the precision of a low-precision sub-pixel and may be equal to or lower than the precision of a high-precision sub-pixel. For example, if a low-precision sub-pixel is in a ½-pixel unit and a high-precision sub-pixel is in a ¼- pixel unit or a ⅛-pixel unit, the predetermined precision may be a ½-pixel unit or a ¼-pixel unit.

The encoding unit 330 may encode a motion vector and weight information of a single low-precision sub-pixel for a single high-precision sub-pixel. The weight information may be encoded in the form of indices that are set for weights of the low-precision sub-pixels.

Figure 4:
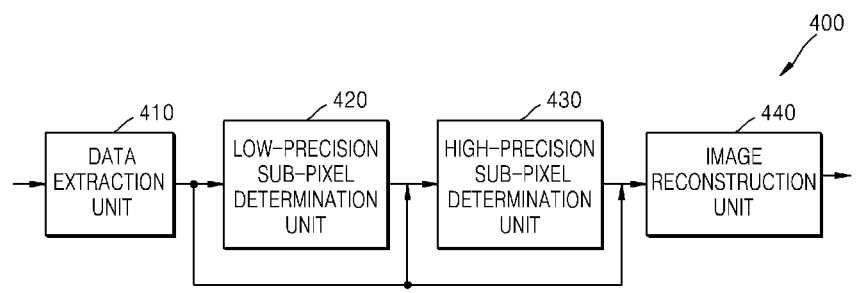
FIG. 4 is a block diagram of an apparatus for decoding an image by using motion prediction according to an exemplary embodiment of the present invention.

FIG. 4 is a block diagram of an apparatus 400 for decoding an image by using motion prediction according to an embodiment of the present invention.

The apparatus 400 according to an embodiment of the present invention includes a data extraction unit 410, a low-precision sub-pixel determination unit 420, a high-precision sub-pixel determination unit 430, and an image reconstruction unit 440.

The data extraction unit 410 receives a data stream of an encoded image and extracts image data, a motion vector, and weight information for a predetermined-precision sub-pixel from the received data stream. The extracted image data and motion vectors are output to the low-precision sub-pixel determination unit 420, and the extracted weight information is output to the high-precision sub-pixel determination unit 430.

The low-precision sub-pixel determination unit 420 determines low-precision sub-pixels from a reference block or a reference picture by using the motion vectors and the image data input from the data extraction unit 410, and outputs the determined low-precision sub-pixels to the high-precision sub-pixel determination unit 430.

The high-precision sub-pixel determination unit 430 receives the weight information from the data extraction unit 410 and the determined low-precision sub-pixels from the low-precision sub-pixel determination unit 420, and determines a high-precision sub-pixel by using the low-precision sub-pixels and the weight information. The high-precision sub-pixel determination unit 430 outputs the determined high-precision sub-pixel to the image reconstruction unit 440.

If the input weight information is in the form of indices, the high-precision sub-pixel determination unit 430 may determine weights for respective low-precision sub-pixels to be interpolated for motion prediction. The high-precision sub-pixel determination unit 430 may also determine a high-precision sub-pixel by applying corresponding weights to low-precision sub-pixels located in a predetermined direction.

The high-precision sub-pixel determination unit 430 determines the predetermined-precision sub-pixel based on the extracted motion vector for the predetermined-precision sub-pixel and determines an interpolation direction for the low-precision sub-pixels according to the position of the predetermined-precision sub-pixel. The predetermined precision may be equal to or higher than the precision of the low-precision sub-pixel and may be equal to or lower than the precision of the high-precision sub-pixel.

Like the apparatus 300 for encoding an image, the weight information of the apparatus 400 for decoding an image may also be in proportion to a distance from each of low-precision sub-pixels to be interpolated to the low-precision sub-pixels, or may be separately set in units of at least one data unit.

The low-precision sub-pixels are interpolated by using the determined interpolation direction and weights, thereby determining a high-precision sub-pixel.

The image reconstruction unit 440 performs motion prediction by using the image data input from the data extraction unit 410 and reference information in units of high-precision sub-pixels, which is input from the high-precision sub-pixel determination unit 430, thereby reconstructing the image data.

In the apparatus 300 and the apparatus 400 according to an embodiment of the present invention, a low-precision sub-pixel is in a ½-pixel (or half-pel) unit and a high-precision sub-pixel is in one of a ¼-pixel (or quarter-pel) unit or a ⅛-pixel (or octa-pel) unit.

Figure 5:
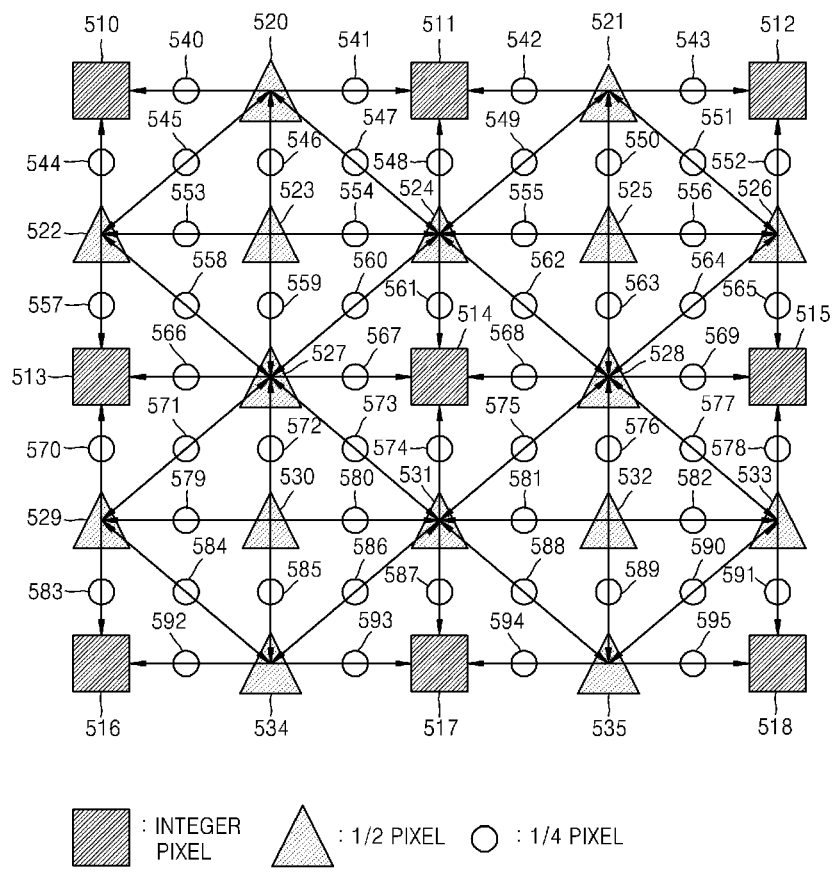
FIG. 5 illustrates interpolation directions for ¼ pixel generation.

FIG. 5 illustrates interpolation directions for ¼ pixel generation. Referring to FIG. 5, the use of interpolation directions in the interpolation direction determination unit 315 of the apparatus 300 and in the low-precision sub-pixel determination unit 420 and the high-precision sub-pixel determination unit 430 of the apparatus 400 will now be described.

FIG. 5 illustrates integer pixels 510 through 518, ½ pixels 520 through 535, and ¼ pixels 540 through 595.

In order to generate a ¼ pixel, its neighboring pixels may be referred to. In other words, ½ pixels (or integer pixels) are interpolated to generate a ¼ pixel. An interpolation direction is determined according to a position of a ¼ pixel to be generated.

A ¼ pixel located in a line where integer pixels are arranged is determined by bilinear interpolation between a neighboring integer pixel and a neighboring ½ pixel that are located in the line. Referring to FIG. 5, a ¼ pixel 540 is determined by bilinear interpolation between an integer pixel 510 and a ½ pixel 520. A ¼ pixel 561 is determined by bilinear interpolation between an integer pixel 514 and a ½ pixel 524. In other words, if a ¼ pixel is located in a line where integer pixels are arranged, a neighboring integer pixel and a neighboring ½ pixel located in the line may be determined to be used for interpolation.

A ¼ pixel located in a line where only ½ pixels are arranged is determined by bilinear interpolation between neighboring ½ pixels located in the line. Referring to FIG. 5, a ¼ pixel 554 is determined by bilinear interpolation between a ½ pixel 523 and a ½ pixel 524. A ¼ pixel 576 is determined by bilinear interpolation between a ½ pixel 528 and a ½ pixel 532. Likewise, if a ¼ pixel is located in a line where only ½ pixels are arranged, neighboring ½ pixels located in the line may be determined to be used for interpolation.

A ¼ pixel located in a line where only ¼ pixels are arranged is determined by bilinear interpolation between neighboring ½ pixels located diagonally to the ¼ pixel. Referring to FIG. 5, a ¼ pixel 558 is determined by bilinear interpolation between a neighboring ½ pixel 522 and a neighboring ½ pixel 527 that are located diagonally to the ¼ pixel 558. A ¼ pixel 575 is determined by bilinear interpolation between a neighboring ½ pixel 528 and a ½ pixel 531 that are located diagonally to the ¼ pixel 575. Since a case where both neighboring pixels located diagonally to a ¼ pixel are ½ pixels is only one, an interpolation direction can be determined according to a position of the ¼ pixel.

Thus, an interpolation direction for low-precision pixels is previously determined for a case (i) where a high-precision pixel in a ¼-pixel unit or a ⅛-pixel unit is located in a line where integer pixels are arranged, a case (ii) where the high-precision pixel is located in a line where only ½ pixels are arranged, and a case (iii) where the high-precision pixel is located in a line where only ¼ pixels are arranged.

Figure 6:
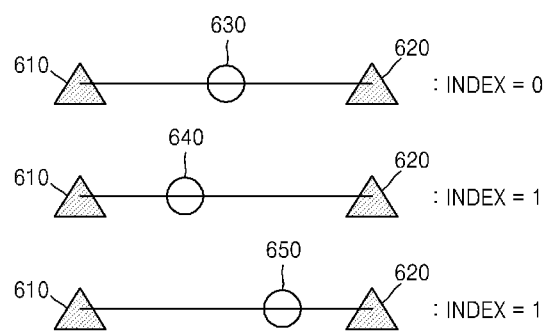
FIG. 6 illustrates weights and indices according to an exemplary embodiment of the present invention.

FIG. 6 illustrates weights and indices according to an embodiment of the present invention. Referring to FIG. 6, the use of weights and indices in the encoding unit 330 of the apparatus 300 and the high-precision sub-pixel determination unit 430 of the apparatus 400 will now be described.

When a high-precision sub-pixel is determined by using low-precision sub-pixels according to an embodiment of the present invention, various high-precision sub-pixels can be generated by interpolation which applies various weights determined by the weight determination unit 310 to two low-precision sub-pixels. The weights may be determined to be in proportion to a distance from each low-precision sub-pixel to be interpolated to a high-precision sub-pixel.

For example, by performing interpolation which applies weights of ½ and ½ to sub-pixels 610 and 620 in a ½-pixel unit, a high-precision sub-pixel 630 in a ¼-pixel unit is generated, which is similar to a general way to generate a ¼ pixel by using ½ pixels in H.264 encoding/decoding methods.

Moreover, a sub-pixel 640 in a ⅛-pixel unit is generated by performing interpolation which applies weights of ⅔ and ⅓ to the sub-pixels 610 and 620 in a ½-pixel unit. A sub-pixel 650 in a ⅛-pixel unit is generated by performing interpolation which applies weights of ⅓ and ⅔ to the sub-pixels 610 and 620 in a ½-pixel unit. Thus, by adjusting weights for interpolation of sub-pixels in a ½-pixel unit, a high-precision sub-pixel in a ⅛-pixel unit as well as a high-precision sub-pixel in a ¼-pixel unit can be generated.

In order to efficiently encode weights to be used for interpolation of low-precision sub-pixels, the apparatus 300 for encoding an image according to an embodiment of the present invention may define indices expressing the weights. For example, in order to determine a high-precision sub-pixel in a ¼-pixel unit and a high-precision sub-pixel in a ⅛-pixel unit by using the low-precision sub-pixels 610 and 620 in a ½-pixel unit, 3 weight sets are required and are defined as 3 indices. In other words, for generating a sub-pixel in a ¼-pixel unit, a weight set (½, ½) may be defined as an index 0, a weight set (⅔, ⅓) may be defined as an index 1, and a weight set (⅓, ⅔) may be defined as an index 2.

The encoding unit 330 of the apparatus 300 according to an embodiment of the present invention may encode indices corresponding to weights. On the other hand, if the indices corresponding to the weights are received, the high-precision sub-pixel determination unit 430 of the apparatus 400 for decoding an image reads weights corresponding to indices and applies the read weights to interpolation of low-precision sub-pixels.

Figure 7A:
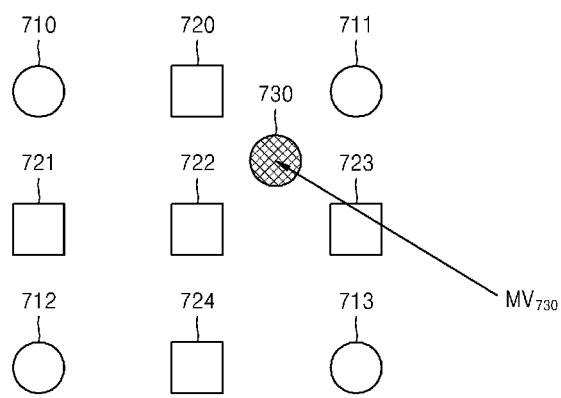
FIG. 7A illustrates a way to express a conventional high-precision sub-pixel.

FIG. 7A illustrates a way to express a conventional high-precision sub-pixel.

According to the conventional high-precision sub-pixel expression method, a motion vector indicating a high-precision sub-pixel is required. In other words, even when ½ pixels 710, 711, 712, and 713 and ¼ pixels 720, 721, 722, 723, and 724 are used to determine a sub-pixel 730 in a ⅛-pixel unit, motion prediction information of the sub-pixel 730 in a ⅛-pixel unit is expressed as a motion vector $MV_{730}$ corresponding to the sub-pixel 730 in a ⅛-pixel unit.

Figure 7B:
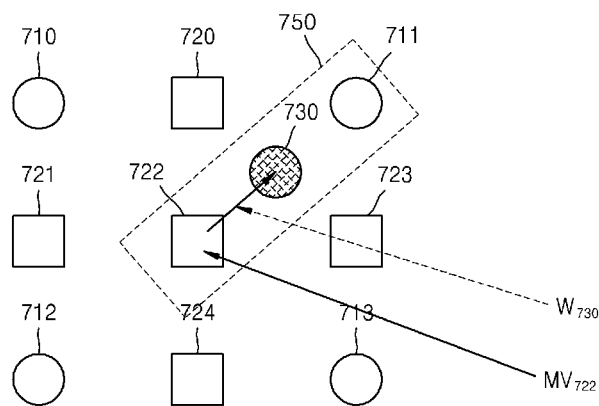
FIG. 7B illustrates a way to express a high-precision sub-pixel according to an exemplary embodiment of the present invention.

FIG. 7B illustrates a way to express a high-precision sub-pixel according to an embodiment of the present invention.

Referring to FIG. 7B, encoding of motion vectors and weights in the encoding unit 330 of the apparatus 300 and the use of motion vectors and weight information in the low-precision sub-pixel determination unit 420 and the high-precision sub-pixel determination unit 430 of the apparatus 400 will now be described.

For determination of the high-precision sub-pixel 730 in a ⅛-pixel unit according to an embodiment of the present invention, the high-precision sub-pixel 730 requires only motion prediction information for predetermined-precision sub-pixels 722 and 711. At this time, the predetermined precision is a ½-pixel unit (for 711) or a ¼-pixel unit (for 722).

Whether the predetermined precision is a ½-pixel unit or a ¼-pixel unit has an influence upon the manner in which low-precision sub-pixels to be interpolated are determined. In other words, if the predetermined precision is a ½-pixel unit (for 711), a predetermined-precision sub-pixel may be a low-precision sub-pixel to be interpolated. However, if the predetermined precision is a ¼-pixel unit (for 722), positions of low-precision sub-pixels are not accurately indicated. Instead, positions of neighboring low-precision sub-pixels to be interpolated may be determined according to a position of a sub-pixel in a ¼-pixel unit. In other words, interpolation is performed by using neighboring low-precision sub-pixels located in an interpolation direction determined according to a position of a sub-pixel in a ¼-pixel unit as described with reference to FIG. 5, thereby determining a high-precision sub-pixel.

Assuming that an interpolation direction 750 for the predetermined-precision sub-pixels 722 and 711 is previously set according to the position of the high-precision sub-pixel 730, neighboring low-precision sub-pixels to be interpolated are also determined according to the position of the high-precision sub-pixel 730. Thus, even when only a motion vector $MV_{722}$ is given as motion prediction information for the single predetermined-precision sub-pixel 722, the position of the high-precision sub-pixel 730 can be expressed.

At this time, the accurate position of the high-precision sub-pixel 730 or whether the predetermined precision is a ¼-pixel unit or a ⅛-pixel unit is determined by a weight $W_{730}$ for interpolation of the low-precision sub-pixels 711 and 712. A motion vector indicating values of a horizontal axis and a vertical axis may be expressed as a 2-dimensional (2D) signal and information about a weight for interpolation may be expressed as a 1-dimensional (1D) signal.

Thus, the high-precision sub-pixel 730 may be expressed only with the motion vector $MV_{722}$ for the predetermined-precision sub-pixel 722 (or a motion vector for the sub-pixel 711), which is 2D information, and the weight $W_{730}$ that is 1D information. Such an expression is different from the expression of the high-precision sub-pixel 730 with its motion vector $MV_{730}$ in terms of the amount of data. The amount of data of a motion vector for the sub-pixel 730 in a ⅛-pixel unit is greater by about 4 times than that of a motion vector for the sub-pixel 722 in a ¼-pixel unit. Thus, the high-precision sub-pixel 730 can be expressed with a smaller amount of data, i.e., the motion vector $MV_{722}$ for the predetermined-precision sub-pixel 722, which is a 2D signal, and the weight $W_{730}$ that is a 1D signal, instead of a large amount of data, i.e., a motion vector for the sub-pixel 730, which is a 2D signal.

Figure 8A:
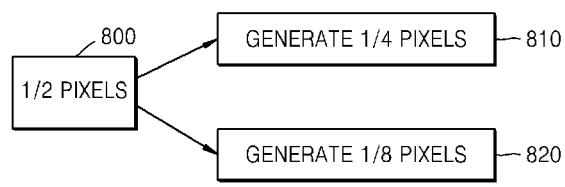
FIG. 8A illustrates a process of generating a conventional high-precision sub-pixel.

FIG. 8A illustrates a process of generating a conventional high-precision sub-pixel.

In conventional motion prediction of image encoding/decoding, ½ pixels are generated by applying 6-tap filtering on integer pixels in operation 800, ¼ pixels are generated by using the ½ pixels in operation 810, and ⅛ pixels are determined separately from determination of ½ pixels and ¼ pixels in operation 820.

Figure 8B:
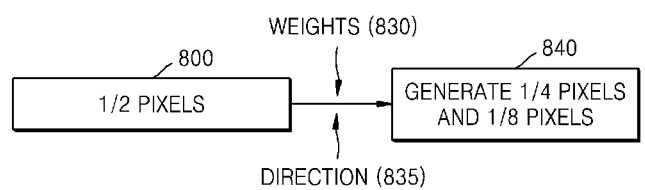
FIG. 8B illustrates a process of generating a high-precision sub-pixel according to an exemplary embodiment of the present invention.

FIG. 8B illustrates a process of generating a high-precision sub-pixel according to an embodiment of the present invention.

The apparatus 300 and the apparatus 400 according to an embodiment of the present invention may generate both ¼ pixels and ⅛ pixels in operation 840 by performing interpolation using a weight 830 that is adaptive to ½ pixels 800 determined using 6-tap filtering and an interpolation direction 835 based on a position of a high-precision sub-pixel, thereby simplifying the process of generating a high-precision sub-pixel.

Hereinafter, interpolation directions for low-precision sub-pixels for generating a high-precision sub-pixel will be described with reference to FIGS. 9A through 9D. Since the interpolation directions are determined according to a position of a high-precision sub-pixel, the apparatus 300 generates low-precision sub-pixels in a preset interpolation direction for the low-precision sub-pixels in order to perform motion prediction. The apparatus 400 also interpolates low-precision sub-pixels in a preset interpolation direction to generate a high-precision sub-pixel and performs motion prediction, thereby performing image decoding. Thus, if an interpolation direction is preset, it is not necessary to encode information indicating the interpolation direction, thereby saving data.

Figure 9A:
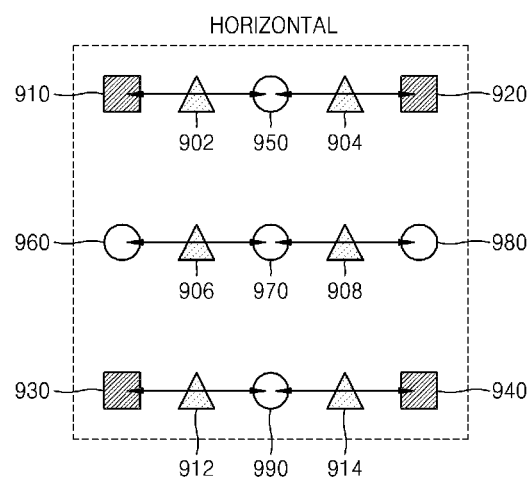
FIG. 9A illustrates horizontal interpolation for high-precision sub-pixel generation.

FIG. 9A illustrates horizontal interpolation for high-precision sub-pixel generation.

In order to generate high-precision sub-pixels in ¼-pixel units or ⅛-pixel units, integer pixels and ½ pixels, which are horizontally adjacent to the high-precision sub-pixels, are interpolated. In other words, (i) an integer pixel 910 and a ½ pixel 950 for a high-precision sub-pixel 902, (ii) an integer pixel 920 and a ½ pixel 950 for a high-precision sub-pixel 904, (iii) an integer pixel 930 and a ½ pixel 990 for a high-precision sub-pixel 912, (iv) an integer pixel 940 and the ½ pixel 990 for a high-precision sub-pixel 914, (v) ½ pixels 960 and 970 for a high-precision sub-pixel 906, and (vi) ½ pixels 970 and 980 for a high-precision sub-pixel 908 are interpolated.

Figure 9B:
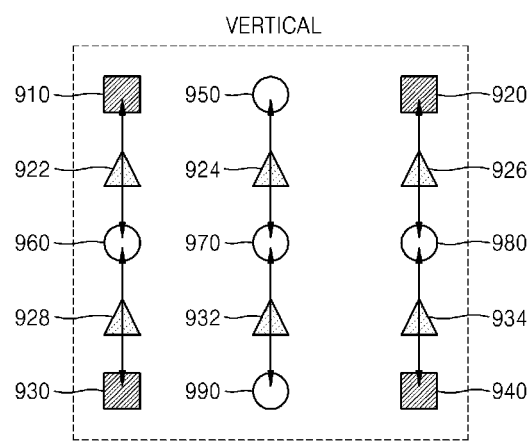
FIG. 9B illustrates vertical interpolation for high-precision sub-pixel generation.

FIG. 9B illustrates vertical interpolation for high-precision sub-pixel generation.

In order to generate high-precision sub-pixels in a ¼-pixel unit or a ⅛-pixel unit, integer pixels and ½ pixels, which are vertically adjacent to the high-precision sub-pixels, are interpolated. In other words, (i) an integer pixel 910 and a ½ pixel 960 for a high-precision sub-pixel 922, (ii) an integer pixel 930 and a ½ pixel 960 for a high-precision sub-pixel 928, (iii) an integer pixel 920 and a ½ pixel 980 for a high-precision sub-pixel 926, (iv) an integer pixel 940 and the ½ pixel 980 for a high-precision sub-pixel 934, (v) ½ pixels 950 and 970 for a high-precision sub-pixel 924, and (vi) ½ pixels 970 and 990 for a high-precision sub-pixel 932 are interpolated.

Figure 9C:
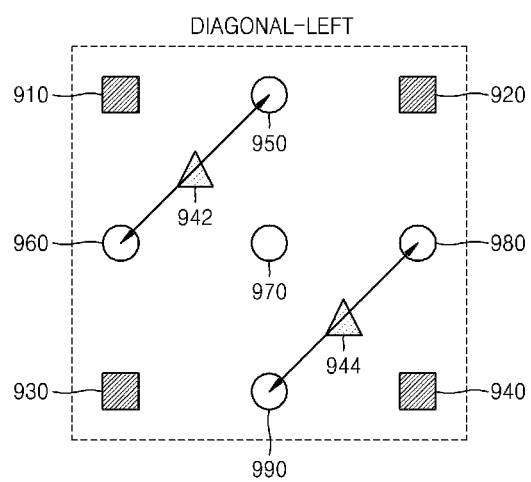
FIG. 9C illustrates left diagonal interpolation for high-precision sub-pixel generation.

FIG. 9C illustrates left diagonal interpolation for high-precision sub-pixel generation.

In order to generate high-precision sub-pixels in a ¼-pixel unit or a ⅛-pixel unit, ½ pixels, which are left-diagonally adjacent to the high-precision sub-pixels, are interpolated. In other words, (i) ½ pixels 950 and 960 for a high-precision sub-pixel 942, and (ii) ½ pixels 980 and 990 for a high-precision sub-pixel 944 are interpolated.

Figure 9D:
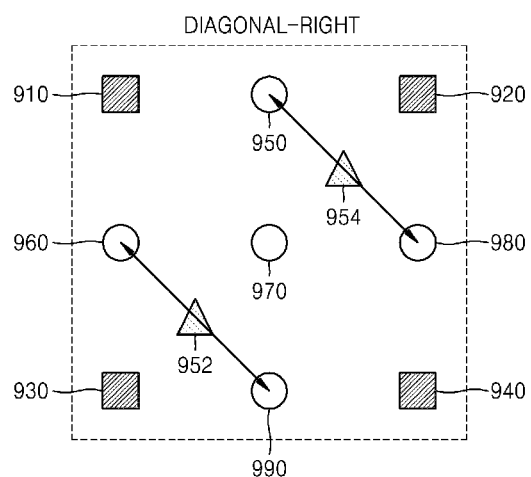
FIG. 9D illustrates right diagonal interpolation for high-precision sub-pixel generation.

FIG. 9D illustrates right diagonal interpolation for high-precision sub-pixel generation.

In order to generate high-precision sub-pixels in a ¼-pixel unit or a ⅛-pixel unit, ½ pixels, which are right-diagonally adjacent to the high-precision sub-pixels, are interpolated. In other words, (i) ½ pixels 960 and 990 for a high-precision sub-pixel 952, and (ii) ½ pixels 950 and 980 for a high-precision sub-pixel 954 are interpolated.

Since the apparatus 300 and the apparatus 400 according to an embodiment of the present invention generates only ⅛ pixels in highly likely positions by using an interpolation direction for integer pixels and ½ pixels in order to use the ⅛ pixels for motion prediction, more efficient motion prediction can be achieved than when ⅛ pixels are generated by applying bilinear filtering on ¼ pixels.

The apparatus 300 and the apparatus 400 according to an embodiment of the present invention may use different interpolation directions for different data processing units such as a frame, a picture, a slice, and a block. In this case, the apparatus 300 for encoding an image may encode interpolation direction information. If the interpolation direction information is received, the apparatus 400 for decoding an image may perform motion-prediction compensation according to the received interpolation direction information in order to reconstruct an image.

Figure 10:
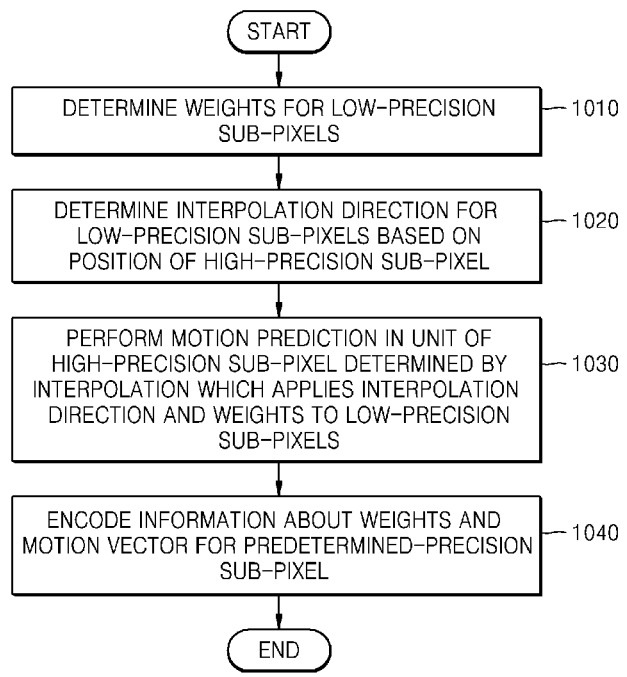
FIG. 10 is a flowchart of a method of encoding an image by using motion prediction according to an exemplary embodiment of the present invention.

FIG. 10 is a flowchart of a method of encoding an image by using motion prediction according to an embodiment of the present invention.

In operation 1010, for interpolation between low-precision sub-pixels, weights for the respective low-precision sub-pixels are determined. The weights may be determined to be in proportion to a distance from each low-precision sub-pixel to the low-precision sub-pixels to be interpolated.

In operation 1020, an interpolation direction of the low-precision sub-pixels is determined based on a position of a high-precision sub-pixel between the low-precision sub-pixels. The interpolation direction is determined in units of at least one data unit and the data unit may be a frame, a picture, a slice, or a block. A predetermined precision may be equal to or higher than the precision of a low-precision sub-pixel and may be equal to or lower than the precision of a high-precision sub-pixel.

In operation 1030, motion prediction is performed in units of high-precision sub-pixels determined by interpolation which applies the interpolation direction and the weights to the low-precision sub-pixels.

In operation 1040, weight information and a motion vector for a predetermined-precision sub-pixel may be encoded as motion prediction information for the high-precision sub-pixel. Since the interpolation direction has been set, motion prediction information for only one of low-precision sub-pixels in the interpolation direction may be encoded. The weight information may be defined in the form of indices.

Figure 11:
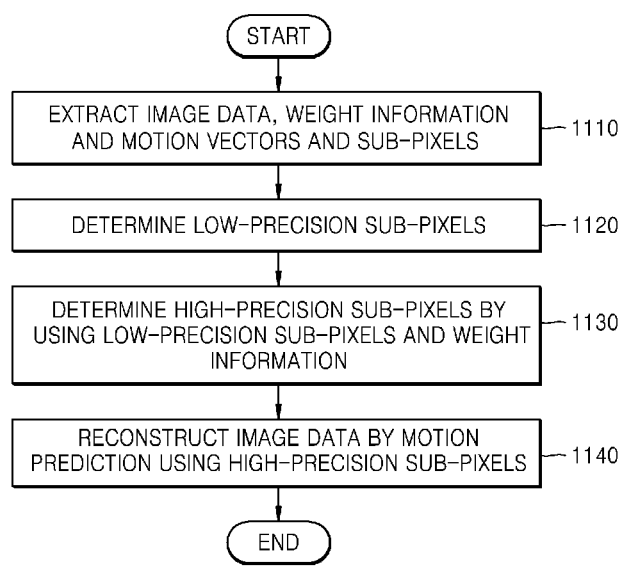
FIG. 11 is a flowchart of a method of decoding an image by using motion prediction according to an exemplary embodiment of the present invention.

FIG. 11 is a flowchart of a method of decoding an image by using motion prediction according to an embodiment of the present invention.

In operation 1110, image data, a motion vector, and weight information for a predetermined-precision sub-pixel are extracted from a received data stream. If the weight information is received in the form of indices, weights corresponding to the indices are determined and low-precision sub-pixels are interpolated by applying the determined weights to the low-precision sub-pixels in order to determine high-precision sub-pixels. The weights may be in proportion to a distance from each low-precision sub-pixel to low-precision sub-pixels in an interpolation direction.

In operation 1120, low-precision sub-pixels are determined by using the extracted image data and the extracted motion vector for the predetermined-precision sub-pixel. The predetermined precision may be equal to or higher than the precision of a low-precision sub-pixel and may be equal to or lower than the precision of a high-precision sub-pixel.

In operation 1130, high-precision sub-pixels are determined by using the low-precision sub-pixels and the weight information. The low-precision sub-pixel may be in a ½-pixel unit and the high-precision sub-pixel may be in at least one of a ¼-pixel unit and a ⅛-pixel unit. At this time, the predetermined precision may be one of a ½-pixel unit and a ¼-pixel unit.

In operation 1140, motion prediction is performed on the extracted image data by using the high-precision sub-pixels, thereby reconstructing image data.

According to the present invention, it is possible to easily generate high-precision sub-pixels and to precisely and accurately perform motion prediction and motion compensation by using information of low-precision sub-pixels. Moreover, by using only high-precision sub-pixels that are highly likely to be used for motion prediction, the amount of computation can be reduced.

Furthermore, instead of 2D motion vector information for each high-precision sub-pixel, 2D motion vectors and 1D direction information for a predetermined-precision sub-pixel are used to indicate information about the high-precision sub-pixel, thereby reducing overhead for the high-precision sub-pixel.

The present invention can be embodied as a program that can be executed on a computer and can be implemented in a general-purpose digital computer that executes the program using a computer-readable recording medium. Examples of computer-readable recording media include magnetic recording media such as read-only memory (ROM), floppy disks, and hard disks, and optical reading media such as CD-ROMs and digital versatile discs (DVDs).

While the present invention has been particularly shown and described with reference to an embodiment thereof, it will be understood by one of ordinary skill in the art that various changes in form and detail may be made therein without departing from the spirit and scope of the present invention as defined by the following claims.

What is claimed is:

1. A method of encoding an image by using motion prediction, the method comprising:
   determining weights for respective low-precision sub-pixels for interpolation between the low-precision sub-pixels to determine a high-precision sub-pixel between the low-precision sub-pixels;
   determining an interpolation direction for the low-precision sub-pixels based on a position of the high-precision sub-pixel;
   performing motion prediction in units of high-precision sub-pixels determined by interpolation which applies the interpolation direction and the weights to the low-precision sub-pixels; and
   encoding information about a weight for interpolation for the high-precision sub-pixel and a motion vector for a predetermined-precision sub-pixel, as motion prediction information for the high-precision sub-pixel,
   wherein the predetermined precision is equal to or higher than precisions of the low-precision sub-pixels and is lower than a precision of the high-precision sub-pixel.

2. The method of claim 1, wherein the determining the interpolation direction comprises determining the interpolation direction in units of at least one data unit, and the data unit is at least one of a frame, a picture, a slice, and a block.

3. The method of claim 1, wherein the determining the interpolation direction comprises determining the interpolation direction to be one of a direction of interpolation between adjacent low-precision sub-pixels arranged vertically, a direction of interpolation between adjacent low-precision sub-pixels arranged horizontally, a direction of interpolation between adjacent low-precision sub-pixels arranged diagonally-right, and a direction of interpolation between adjacent low-precision sub-pixels arranged diagonally-left, according to a position of the high-precision sub-pixel.

4. The method of claim 1, wherein the determining the weights comprises determining the weights that are in proportion to distances from the respective low-precision sub-pixels to the low-precision sub-pixels to be interpolated.

5. The method of claim 4, wherein the determining the weights comprises determining the weights to include one of a set of weights of ⅓ and ⅔ for the low-precision sub-pixels to be interpolated, a set of weights of ½ and ½ for the low-precision sub-pixels to be interpolated, and a set of weights ⅔ and ⅓ for the low-precision sub-pixels to be interpolated.

6. The method of claim 1, wherein the encoding the information and the motion vector comprises encoding predetermined indices that are set for the weights for the low-precision sub-pixels as the information about the weights.

7. A method of decoding an image by using motion prediction, the method comprising:
   extracting image data, a motion vector, and weight information for interpolation for a high-precision sub-pixel from a received data stream;
   determining the low-precision sub-pixels by using the extracted image data and a motion vector for a predetermined-precision sub-pixel from the extracted motion vector;
   determining a high-precision sub-pixel by using the determined low-precision sub-pixels and the extracted weight information;
   determining a motion vector of the high-precision sub-pixel by using the extracted weight information and the motion vector for the predetermined-precision sub-pixel; and
   reconstructing image data by performing motion prediction on the extracted image data by using the image data, the motion vector, the high-precision sub-pixel and the motion vector of the high-precision sub-pixel,
   wherein the predetermined precision is equal to or higher than precisions of the low-precision sub-pixels and is lower than a precision of the high-precision sub-pixel.

8. The method of claim 7, wherein the determination of the high-precision sub-pixel comprises:
   determining, if the extracted weight information is in a form of indices, weights corresponding to the indices for respective low-precision sub-pixels to be interpolated; and
   determining the high-precision sub-pixel by applying corresponding weights to low-precision sub-pixels located in a predetermined interpolation direction.

9. The method of claim 8, wherein in the determining the weights, the weights are in proportion to distances of the respective low-precision sub-pixels to be interpolated and are determined to include one of a set of weights of ⅓ and ⅔ for the low-precision sub-pixels to be interpolated, a set of weights of ½ and ½ for the low-precision sub-pixels to be interpolated, and a set of weights ⅔ and ⅓ for the low-precision sub-pixels to be interpolated.

10. The method of claim 8, wherein in the determining the high-precision sub-pixel, the interpolation direction is set in units of at least one data unit and the data unit is at least one of a frame, a picture, a slice, and a block.

11. The method of claim 8, wherein the determining the high-precision sub-pixel comprises:
   determining the low-precision sub-pixels among adjacent low-precision sub-pixels of the predetermined-precision sub-pixel based on the extracted motion vector for the predetermined-precision sub-pixel; and
   determining the interpolation direction to be one of a direction of interpolation between the adjacent low-precision sub-pixels arranged vertically, a direction of interpolation between the adjacent low-precision sub-pixels arranged horizontally, a direction of interpolation between the adjacent low-precision sub-pixels arranged diagonally-right, and a direction of interpolation between the adjacent low-precision sub-pixels arranged diagonally-left, according to a position of the predetermined-precision sub-pixel.

12. An apparatus for encoding an image by using motion prediction, the apparatus comprising:
   a weight determination unit which determines weights for respective low-precision sub-pixels for interpolation between the low-precision sub-pixels to determine a high-precision sub-pixel between the low-precision sub-pixels;
   an interpolation direction determination unit which determines an interpolation direction for the low-precision sub-pixels based on a position of the high-precision sub-pixel;
   a motion prediction unit which performs motion prediction in units of high-precision sub-pixels determined by interpolation which applies the interpolation direction and the weights to the low-precision sub-pixels; and
   an encoding unit which encodes information about a weight for interpolation for the high-precision sub-pixel and a motion vector for a predetermined-precision sub-pixel, as motion prediction information for the high-precision sub-pixel,
   wherein the predetermined precision is equal to or higher than precisions of the low-precision sub-pixels and is lower than a precision of the high-precision sub-pixel.

13. The apparatus of claim 12, wherein the interpolation direction determination unit determines the interpolation direction in units of at least one data unit, and the data unit is at least one of a frame, a picture, a slice, and a block.

14. The apparatus of claim 12, wherein the weight determination unit determines the weights that are in proportion to distances from the respective low-precision sub-pixels to the low-precision sub-pixels to be interpolated.

15. The apparatus of claim 12, wherein the encoding unit encodes predetermined indices that are set for the weights for the low-precision sub-pixels as the information about the weight.

16. An apparatus for decoding an image by using motion prediction, the apparatus comprising:
   a data extraction unit which extracts image data, a motion vector, and weight information for interpolation for a high-precision sub-pixel from a received data stream;
   a low-precision sub-pixel determination unit which determines the low-precision sub-pixels by using the extracted image data and a motion vector for a predetermined-precision sub-pixel from the extracted motion vector;
   a high-precision sub-pixel determination unit which determines a high-precision sub-pixel by using the determined low-precision sub-pixels and the extracted weight information and determines a motion vector of the high-precision sub-pixel by using the extracted weight information and the motion vector for the predetermined-precision sub-pixel; and an image reconstruction unit which reconstructs image data by performing motion prediction on the extracted image data by using the image data, the motion vector, the high-precision sub-pixel and the motion vector of the determined high-precision sub-pixel, wherein the predetermined precision is equal to or higher than precisions of the low-precision sub-pixels and is lower than a precision of the high-precision sub-pixel.

17. The apparatus of claim 16, wherein if the weight information is in a form of indices, the high-precision sub-pixel determination unit determines weights corresponding to the indices for respective low-precision sub-pixels to be interpolated, and determines the high-precision sub-pixel by applying corresponding weights to the low-precision sub-pixels located in a predetermined interpolation direction.

18. The apparatus of claim 17, wherein the high-precision sub-pixel determination unit determines the interpolation direction according to a position of the predetermined-precision sub-pixel determined based on the extracted motion vector for the predetermined-precision sub-pixel.

19. The apparatus of claim 17, wherein the high-precision sub-pixel determination unit determines the weights that are in proportion to distances from the respective low-precision sub-pixels to the low-precision sub-pixels to be interpolated.

20. A non-transitory computer-readable recording medium having recorded thereon a program for implementing a method of encoding an image by using motion prediction, the method comprising:

determining weights for respective low-precision sub-pixels for interpolation between the low-precision sub-pixels to determine a high-precision sub-pixel between the low-precision sub-pixels;

determining an interpolation direction for the low-precision sub-pixels based on a position of the high-precision sub-pixel;

performing motion prediction in units of high-precision sub-pixels determined by interpolation which applies the interpolation direction and the weights to the low-precision sub-pixels; and encoding information about a weight for interpolation for the high-precision sub-pixel and a motion vector for a predetermined-precision sub-pixel, as motion prediction information for the high-precision sub-pixel, wherein the predetermined precision is equal to or higher than precisions of the low-precision sub-pixels and is lower than a precision of the high-precision sub-pixel.

21. A non-transitory computer-readable recording medium having recorded thereon a program for implementing a method of decoding an image by using motion prediction, the method comprising:

extracting image data, a motion vector, and weight information for interpolation for a high-precision sub-pixel from a received data stream;

determining the low-precision sub-pixels by using the extracted image data and a motion vector for a predetermined-precision sub-pixel from the extracted motion vector;

determining a high-precision sub-pixel by using the determined low-precision sub-pixels and the extracted weight information;

determining a motion vector of the high-precision sub-pixel by using the extracted weight information and the motion vector for the predetermined-precision sub-pixel; and reconstructing image data by performing motion prediction on the extracted image data by using the image data, the motion vector, the high-precision sub-pixel and the motion vector of the high-precision sub-pixel, wherein the predetermined precision is equal to or higher than precisions of the low-precision sub-pixels and is lower than a precision of the high-precision sub-pixel.

* * * * *